(12) United States Patent
Kawabe et al.

(10) Patent No.: US 10,100,394 B2
(45) Date of Patent: Oct. 16, 2018

(54) HIGH-STRENGTH GALVANNEALED STEEL SHEET AND METHOD FOR MANUFACTURING THE SAME

(71) Applicant: JFE STEEL CORPORATION, Tokyo (JP)

(72) Inventors: Hidetaka Kawabe, Tokyo (JP); Takeshi Yokota, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 302 days.

(21) Appl. No.: 14/779,780

(22) PCT Filed: Mar. 26, 2014

(86) PCT No.: PCT/JP2014/001729
§ 371 (c)(1),
(2) Date: Sep. 24, 2015

(87) PCT Pub. No.: WO2014/156141
PCT Pub. Date: Oct. 2, 2014

(65) Prior Publication Data
US 2016/0047025 A1 Feb. 18, 2016

(30) Foreign Application Priority Data

Mar. 28, 2013 (JP) .................................. 2013-068297

(51) Int. Cl.
C23C 2/02 (2006.01)
C21D 6/00 (2006.01)
C22C 38/00 (2006.01)
B32B 15/01 (2006.01)
C21D 8/02 (2006.01)
C22C 38/04 (2006.01)
C22C 38/06 (2006.01)
C21D 9/46 (2006.01)
C23C 2/40 (2006.01)
C23C 2/28 (2006.01)
C23C 2/06 (2006.01)
C22C 38/02 (2006.01)

(52) U.S. Cl.
CPC .............. *C23C 2/02* (2013.01); *B32B 15/013* (2013.01); *C21D 6/005* (2013.01); *C21D 6/008* (2013.01); *C21D 8/0236* (2013.01); *C21D 8/0247* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C23C 2/06* (2013.01); *C23C 2/28* (2013.01); *C23C 2/40* (2013.01); *C21D 8/0226* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| 9,040,169 B2 | 5/2015 | Hamada |
| 2004/0074575 A1 | 4/2004 | Kashima |
| 2011/0030854 A1* | 2/2011 | Matsuda .................. C21D 1/25 148/504 |
| 2011/0139315 A1 | 6/2011 | Nakagaito |
| 2011/0186189 A1 | 8/2011 | Futamura |
| 2012/0222781 A1 | 9/2012 | Azuma |
| 2013/0167980 A1 | 7/2013 | Kawata |
| 2014/0000765 A1* | 1/2014 | Nozaki ................ C21D 8/0226 148/504 |

FOREIGN PATENT DOCUMENTS

| EP | 1389639 | 2/2004 |
| EP | 2246456 | 11/2010 |
| JP | 2003171735 | 6/2003 |
| JP | 2008291304 | 12/2008 |

(Continued)

OTHER PUBLICATIONS

Chinese Office Action for Chinese Application No. 201480018705.4, dated May 4, 2016, including Concise Statement of Relevance, 13 pages.
International Search Report for International Application No. PCT/JP2014/001729 dated May 13, 2014.
Chinese Office Action for Chinese Application No. 201480018705.4, dated Jan. 20, 2017, including Concise Statement of Relevance of Office Action, 6 pages.
Supplementary European Search Report for Application No. EP 14774823, dated Oct. 20, 2016, 7 pages.
Korean Office Action for Application No. 20157025433, dated Jul. 21, 2016, 14 pages.

(Continued)

*Primary Examiner* — Deborah Yee
(74) *Attorney, Agent, or Firm* — RatnerPrestia

(57) ABSTRACT

A high-strength galvannealed steel sheet has a chemical composition containing, by mass %, C: 0.14% or more and 0.24% or less, Si: 0.8% or more and 1.8% or less, Mn: 1.0% or more and 3.0% or less, P: 0.020% or less, S: 0.0040% or less, Al: 0.01% or more and 0.1% or less, N: 0.01% or less, Ca: 0.0001% or more and 0.0020% or less, and the balance including Fe and incidental impurities, and a microstructure, in which the total area ratio of a ferrite phase and a bainite phase with respect to the whole microstructure is 30% or more and 70% or less, in which the area ratio of a tempered martensite phase with respect to the whole microstructure is 20% or more and 40% or less, in which the area ratio of a retained austenite phase with respect to the whole microstructure is 1% or more and 5% or less, in which the area ratio of a martensite phase with respect to the whole microstructure is 2% or more and 20% or less, and in which the total area ratio of cementite and a pearlite phase with respect to the whole microstructure is 10% or less.

3 Claims, No Drawings

(56) References Cited

FOREIGN PATENT DOCUMENTS

| | | |
|---|---|---|
| JP | 2009203548 | 9/2009 |
| JP | 2010043360 | 2/2010 |
| JP | 2011157583 | 8/2011 |
| JP | 2011168816 | 9/2011 |
| JP | 2011214101 | 10/2011 |
| JP | WO 2012/133563 A1 * | 10/2012 |
| JP | 2012214868 | 11/2012 |
| KR | 20040091751 | 10/2004 |
| KR | 1020100101697 | 9/2010 |
| WO | 2011065591 | 6/2011 |
| WO | 2012036269 | 3/2012 |

OTHER PUBLICATIONS

Korean Office Action for Korean Application No. 2015-7025433, dated Jan. 3, 2017, including Concise Statement of Relevance of Office Action, 5 pages.
European Communication Pursuant to Article 94(3) for European Application No. 14774823.0, dated Jun. 29, 2018, 4 pages.

* cited by examiner

HIGH-STRENGTH GALVANNEALED STEEL SHEET AND METHOD FOR MANUFACTURING THE SAME

CROSS REFERENCE TO RELATED APPLICATIONS

This is the U.S. National Phase application of PCT International Application No. PCT/JP2014/001729, filed Mar. 26, 2014, and claims priority to Japanese Patent Application No. 2013-068297, filed Mar. 28, 2013, the disclosures of each of these application being incorporated herein by reference in their entireties for all purposes.

FIELD OF THE INVENTION

The present invention relates to a high-strength steel sheet suitably used for, for example, automobile parts and a method for manufacturing the steel sheet, that is, to a high-strength galvannealed steel sheet having a tensile strength (TS) of 900 MPa or more without actively adding expensive chemical elements such as Ti, Nb, V, Cu, Ni, Cr, and Mo, and having excellent elongation, bendability, and stretch flange formability and a method for manufacturing the steel sheet.

BACKGROUND OF THE INVENTION

Since many automobile parts have complex shapes, materials for the parts are required to be excellent in terms of formability indexes such as elongation (El), bendability, and stretch flange formability (also referred to as hole-expanding property). In addition, in the case where strength is increased to a TS of 900 MPa class or more, there is a case where very expensive rare chemical elements such as Ti, Nb, V, Cu, Ni, Cr, and Mo are actively added from the viewpoint of achieving high strength.

Here, some techniques have been proposed regarding a galvannealed steel sheet excellent in terms of both elongation and stretch flange formability. For example, Patent Literature 1 discloses a high-strength and high-yield-ratio galvannealed steel sheet having a tensile strength of 980 MPa or more and excellent formability, the steel sheet having a chemical composition containing, by mass %, C: 0.12% to 0.3%, Si: 0.1% or less (exclusive of 0%), Mn: 2.0% to 3.5%, P: 0.05% or less (exclusive of 0%), S: 0.05% or less (exclusive of 0%), Al: 0.005% to 0.1%, N: 0.015% or less (exclusive of 0%), and the balance being Fe and incidental impurities, and having a metallographic structure including a bainite phase as a primary phase, in which the area ratio of a ferrite phase is 3% to 20% and the area ratio of a martensite phase is 10% to 35% with respect to the whole of the microstructure. Patent Literature 2 discloses a high-strength galvanized steel sheet excellent in terms of hole-expanding property and ductility, the steel sheet having a chemical composition containing, by mass %, C: 0.03% to 0.20%, Si: 1.0% or less, Mn: 0.01% to 3%, P: 0.0010% to 0.1%, S: 0.0010% to 0.05%, Al: 0.3% to 2.0%, Mo: 0.01% to 5.0%, one, two, or more of Ti: 0.001% to 0.5%, Nb: 0.001% to 0.5%, B: 0.0001% to 0.0050%, and Cr: 0.01% to 5%, and the balance being Fe and incidental impurities, having a microstructure including, in terms of area ratio, 30% or more of a ferrite phase, and having a tensile strength of 850 MPa or more. Moreover, Patent Literature 3 discloses a galvannealed steel sheet excellent in terms of ductility and corrosion resistance, the steel sheet having a chemical composition containing, by mass %, C: 0.10% to 0.50%, Mn: 1.0% to 3.0%, Si: 0.005% to 2.5%, and Al: 0.005% to 2.5%, in which P content is limited to be 0.05% or less, S content is limited to be 0.02% or less, N content is limited to be 0.006% or less, and the total content of Si and Al satisfies the relationship Si+Al≥0.8%, and having a microstructure including, in terms of area ratio, 10% to 75% of a ferrite phase and 2% to 30% of a retained austenite phase, in which C content in the retained austenite phase is 0.8% to 1.0%.

CITATION LIST

Patent Literature

PTL 1: Japanese Unexamined Patent Application Publication No. 2011-214101
PTL 2: Japanese Unexamined Patent Application Publication No. 2010-43360
PTL 3: Japanese Unexamined Patent Application Publication No. 2011-168816

Summary of the Invention

Since the steel sheet disclosed in Patent Literature 1 has a microstructure including a ferrite phase, a martensite phase, and a bainite phase as a primary phase, the steel sheet is not regarded as having sufficient elongation. Although the steel sheet disclosed in Patent Literature 2 contains Mo, which is an expensive chemical element, and has a microstructure including, in terms of area ratio, 30% or more of a ferrite phase, the steel sheet is not regarded as having sufficient elongation.

In contrast, in the case of the steel sheet disclosed in Patent Literature 3, high elongation is achieved by focusing on the transformation induced plasticity of retained austenite and by controlling the area ratio of a retained austenite phase and C content in retained austenite. However, in reference to Examples in the literature, since it is disclosed only that a steel sheet having a TS of 778.2 to 1043.7 MPa can be obtained in the case where C content is 0.25% to 0.28%, it is not clear whether or not a steel sheet having a TS of 900 MPa or more can be stably obtained by using the technique according to Patent Literature 3 in the case where the C content is less than 0.25%. Here, there is concern that it may not be possible to obtain a welded joint having sufficient strength when spot welding is performed in the case of a steel sheet having a C content of 0.25% or more.

An object of aspects of the present invention is, by solving the problems described above in a chemical composition to which expensive alloy elements such as Ti, Nb, V, Cu, Ni, Cr, and Mo are not actively added, to provide a high-strength galvannealed steel sheet having excellent formability including elongation, bendability, and stretch flange formability and a tensile strength (TS) of 900 MPa or more and a method for manufacturing the steel sheet.

Solution to Problem

The present inventors diligently conducted investigations in order to solve the problems described above and, as a result, found that it is possible to obtain based on items a) and b) below a galvannealed steel sheet particularly excellent in terms of elongation and bendability, and having excellent stretch flange formability and a tensile strength of 900 MPa or more, even with the expensive rare metals described above being added only in small amounts.

a) C content is controlled to be 0.24% or less from the viewpoint of weldability and formability, and b) The metallographic structure is composed of a ferrite phase, a bainite phase, a tempered martensite phase, a retained austenite phase, and a martensite phase with the area ratios of these phases being controlled to be within specified ranges, and the area ratio of cementite and a pearlite phase is controlled to be within specified range or less.

Aspects of the present invention have been completed on the basis of such knowledge, and the subject matter of aspects of the present invention is as follows.

(1) Provided is a high-strength galvannealed steel sheet having a chemical composition containing, by mass %, C: 0.14% or more and 0.24% or less, Si: 0.8% or more and 1.8% or less, Mn: 1.0% or more and 3.0% or less, P: 0.020% or less, S: 0.0040% or less, Al: 0.01% or more and 0.1% or less, N: 0.01% or less, Ca: 0.0001% or more and 0.0020% or less, and the balance comprising Fe and incidental impurities, and a microstructure, in which the total area ratio of a ferrite phase and a bainite phase with respect to the whole microstructure is 30% or more and 70% or less, in which the area ratio of a tempered martensite phase with respect to the whole microstructure is 20% or more and 40% or less, in which the area ratio of a retained austenite phase with respect to the whole microstructure is 1% or more and 5% or less, in which the area ratio of a martensite phase with respect to the whole microstructure is 2% or more and 20% or less, and in which the total area ratio of cementite and a pearlite phase with respect to the whole microstructure is 10% or less.

(2) The high-strength galvannealed steel sheet according to aspects of the present invention can be manufactured using, for example, a method including hot-rolling a steel slab having the chemical composition described above, pickling the hot-rolled steel sheet, thereafter performing cold rolling, thereafter performing a heat treatment including heating the cold-rolled steel sheet to a temperature of 800° C. or higher and 950° C. or lower, and then cooling the heated steel sheet, and thereafter performing another heat treatment including heating the treated steel sheet to a temperature of 700° C. or higher and 850° C. or lower, cooling the heated steel sheet to a temperature of 100° C. or higher and 300° C. or lower at a cooling rate of 5° C./sec or more and 50° C./sec or less, stopping the cooling, subsequently heating the cooled steel sheet to a temperature of 350° C. or higher and 600° C. or lower and holding the heated steel sheet for 10 seconds or more and 500 seconds or less, thereafter dipping the held steel sheet in a zinc bath in order to perform a galvanizing treatment, and heating the galvanized steel sheet to a temperature of 480° C. or higher and 580° C. or lower in order to perform an alloying treatment.

(3) It is preferable that the method according to aspects of the present invention further include performing a heat treatment on the pickled steel sheet in such a manner that the pickled steel sheet is heated to a temperature of 400° C. or higher and 750° C. or lower before the cold rolling is performed.

According to aspects of the present invention, it is possible to obtain a high-strength galvannealed steel sheet excellent in terms of elongation, bendability, and stretch flange formability and having a tensile strength of 900 MPa or more without actively adding the expensive chemical elements described above. In addition, the high-strength galvannealed steel sheet obtained using aspects of the present invention can suitably be used for automobile parts which are formed into shapes with strict requirements by performing press forming.

DETAILED DESCRIPTION OF EMBODIMENTS OF THE INVENTION

The present inventors diligently conducted investigations for increasing the elongation and bendability of a high-strength galvannealed steel sheet and, as a result, found that there is a significant increase in elongation and bendability by having a specified microstructure, even with a chemical composition which contains a comparatively small amount of C and which does not contain expensive chemical elements such as Ti, Nb, V, Cu, Ni, Cr, and Mo. That is, in aspects of the present invention, the microstructure is formed in such a manner that the total area ratio of a ferrite phase and a bainite phase with respect to the whole microstructure is 30% or more and 70% or less, that the area ratio of a tempered martensite phase with respect to the whole microstructure is 20% or more and 40% or less, that the area ratio of a retained austenite phase with respect to the whole microstructure is 1% or more and 5% or less, that the area ratio of a martensite phase with respect to the whole microstructure is 2% or more and 20% or less, and that the total area ratio of cementite and a pearlite phase with respect to the whole microstructure is 10% or less. Aspects of the present invention will be described in detail hereafter.

First, the chemical composition according to aspects of the present invention will be described. Here, the contents of the constituent chemical elements are all expressed in units of mass %, and "mass %" will be expressed simply as "%" hereinafter, unless otherwise noted.

C: 0.14% or More and 0.24% or Less

C is an austenite-stabilizing chemical element, and is a chemical element which contributes to an increase in uniform elongation by influencing the formation of a retained austenite phase and to an increase in strength by influencing the area ratios and hardnesses of a tempered martensite phase and a martensite phase. In the case where the C content is less than 0.14%, since a ferrite phase is formed in an excessive amount, it is difficult to achieve satisfactory tensile strength, and it is not possible to obtain a desired amount of retained austenite, which makes excellent elongation difficult to be achieved. Therefore, the C content is set to be 0.14% or more, or preferably 0.16% or more. On the other hand, in the case where the C content is more than 0.24%, there is a significant decrease in weldability, and it is difficult to achieve excellent elongation and bendability due to an excessive increase in tensile strength as a result of a martensite phase becoming excessively hard. Therefore, the C content is set to be 0.24% or less, preferably 0.22% or less, or more preferably 0.21% or less. Therefore, the C content is set to be 0.14% or more and 0.24% or less. From the viewpoint of weldability, it is preferable that the C content be 0.16% or more and 0.22% or less, or more preferably 0.16% or more and 0.21% or less.

Si: 0.8% or More and 1.8% or Less

Si is a chemical element which is effective for increasing the strength of steel through solid solution strengthening and which improves the balance of strength and elongation (TS-El balance) by contributing to an increase in uniform elongation as a result of influencing the formation of a retained austenite phase. In the case where the Si content is less than 0.8%, such effects are not realized. Therefore, the Si content is set to be 0.8% or more, or preferably 0.12% or more. On the other hand, in the case where the Si content is more than 1.8%, since there is an increase in the amount of Si concentrated on the surface, bare spots lacking zinc coating occur. Therefore, the Si content is set to be 1.8% or less, or preferably 1.6% or less. Accordingly, the Si content is set to be 0.8% or more and 1.8% or less, preferably 1.2% or more and 1.8% or less, or more preferably 1.2% or more and 1.6% or less.

Mn: 1.0% or More and 3.0% or Less

Mn is an austenite-stabilizing chemical element, and is a chemical element which contributes to controlling strength by causing desired amounts of tempered martensite phase and martensite phase to be formed finally. In order to realize such an effect, it is necessary that the Mn content be 1.0% or more, preferably 1.5% or more, or more preferably 1.7% or more. On the other hand, in the case where the Mn content is more than 3.0%, since it is not possible to form desired amounts of a ferrite phase and a bainite phase due to an excessive increase in hardenability, there is an increase in the area ratios of a tempered martensite phase and a martensite phase, which makes excellent elongation difficult to be achieved due to an excessive increase in hardness. Therefore, the Mn content is set to be 3.0% or less, preferably 2.5% or less, or more preferably 2.3% or less. Accordingly, the Mn content is set to be 1.0% or more and 3.0% or less, preferably 1.5% or more and 2.5% or less, or more preferably 1.7% or more and 2.3% or less.

P: 0.020% or Less

Since P is a chemical element which has a negative effect on weldability, it is preferable that the P content be as small as possible. Although there is a significant decrease in weldability, in particular, in the case where the P content is more than 0.020%, it is acceptable that the P content be 0.020% or less. Therefore, the P content is set to be 0.020% or less, or preferably less than 0.010%. On the other hand, since there is an increase in cost due to a decrease in production efficiency in a steel making process in the case where the P content is excessively decreased, it is preferable that the P content be 0.001% or more. Accordingly, it is preferable that the P content be 0.001% or more and 0.020% or less. In consideration of weldability, it is more preferable that the P content be 0.001% or more and less than 0.010%.

S: 0.0040% or Less

Since S becomes the origin of an inclusion-induced crack as a result of existing as inclusions in steel, it is preferable that the S content be as small as possible. Although excellent elongation is not obtained and there is a significant decrease in bendability, in particular, in the case where the S content is more than 0.0040%, it is acceptable that the S content be 0.0040% or less. Therefore, the S content is set to be 0.0040% or less, or preferably 0.0020% or less. On the other hand, since it is industrially difficult to decrease the S content beyond certain limits, and since there is an increase in desulfurization costs in a steel making process and there is a decrease in productivity in the case where the S content is excessively decreased, it is preferable that the S content be 0.0001% or more. Accordingly, it is preferable that the S content be 0.0001% or more and 0.0040% or less, or more preferably 0.0001% or more and 0.0020% or less.

Al: 0.01% or More and 0.1% or Less

Al is added as a deoxidizing agent for steel, and it is necessary that the Al content be 0.01% or more, or preferably 0.02% or more. On the other hand, in the case where the Al content is more than 0.1%, since there is an increase in the amount of inclusions such as alumina in the surface layer of a steel sheet, there is a decrease in bendability. Therefore, the Al content is set to be 0.1% or less, preferably 0.08% or less, or more preferably 0.06% or less. Accordingly, the Al content is set to be 0.01% or more and 0.1% or less, preferably 0.02% or more and 0.08% or less, or more preferably 0.02% or more and 0.06% or less.

N: 0.01% or Less

Since N is a chemical element which influences aging characteristic, it is preferable that the N content be as small as possible. Since strain aging becomes noticeable, in particular, in the case where the N content is more than 0.01%, the N content is set to be 0.01% or less, or preferably 0.0060% or less. On the other hand, since there is an increase in denitrification costs in a steel making process and there is a decrease in productivity in the case where the N content is excessively decreased, it is preferable that the N content be 0.0001% or more. Therefore, it is preferable that the N content be 0.0001% or more and 0.01% or less, or more preferably 0.0001% or more and 0.0060% or less.

Ca: 0.0001% or More and 0.0020% or Less

Ca is effective for inhibiting a decrease in local deformation capability by spheroidizing a plate-shaped sulfide which becomes the origin of a crack when deformation is applied. In order to realize such an effect, it is necessary that the Ca content be 0.0001% or more. On the other hand, in the case where the Ca content is more than 0.0020%, since there is an excessive increase in the amount of Ca-based inclusions which become origins of inclusion-induced cracks, there is a decrease in elongation and bendability. Therefore, the Ca content is set to be 0.0020% or less, or preferably 0.0010% or less. Accordingly, the Ca content is set to be 0.0001% or more and 0.0020% or less, or preferably 0.0001% or more and 0.0010% or less.

Here, in the steel sheet according to aspects of the present invention, the constituent chemical elements other than those described above are Fe and incidental impurities. However, chemical elements other than those described above are not excluded as long as the effects of aspects of the present invention are not decreased.

From the viewpoint of not actively including expensive alloy chemical elements that is a purpose of aspects of the present invention, it is preferable that Ti, Nb, V, Cu, Ni, Cr, and Mo not be added.

Hereafter, limited ranges and the reasons for the limitations of the microstructure of steel, which is one of the important conditions of aspects of the present invention, will be described in detail.

Total Area Ratio of a Ferrite Phase and a Bainite Phase with Respect to the Whole Microstructure: 30% or More and 70% or Less A ferrite phase and a bainite phase, which is composed of fine cementite and ferrite phase, are softer than a martensite phase, and contribute to an increase in elongation and bendability. It is necessary that the total area ratio of the ferrite phase and the bainite phase with respect to the whole microstructure be 30% or more in order to achieve desired elongation and bendability. In the case where the total area ratio of a ferrite phase and a bainite phase is less than 30%, since there is an excessive increase in strength due to an increase in the area ratio of a hard martensite phase, it is possible to achieve only low elongation and low bendability. It is preferable that the total area ratio of a ferrite phase and a bainite phase with respect to the whole microstructure be 45% or more. On the other hand, in the case where the total area ratio of a ferrite phase and a bainite phase is more than 70%, it is difficult to achieve a tensile strength of 900 MPa or more, and in addition, it is difficult to form a specific amount of a retained austenite phase, which contributes to an increase in elongation. Therefore, the total area ratio of a ferrite phase and a bainite phase with respect to the whole microstructure is set to be 70% or less, or preferably 65% or less. Accordingly, the total area ratio of a ferrite phase and a bainite phase with respect to the whole microstructure is set to be 30% or more and 70% or less, or preferably 45% or more and 65% or less.

Area Ratio of a Tempered Martensite Phase with Respect to the Whole Microstructure: 20% or More and 40% or Less A tempered martensite phase contributes to an increase in strength, and has less negative effects on elongation and bendability than a hard martensite before being subjected to a tempering treatment. A tempered martensite phase is effective for achieving high TS-El balance, specifically, for satisfying the relationship TS×El≥20000 MPa·% by maintaining excellent elongation and bendability while contributing to an increase in strength. In order to realize such an effect, it is necessary that the area ratio of a tempered martensite phase with respect to the whole microstructure be 20% or more, or preferably 25% or more. However, in the case where the area ratio of a tempered martensite phase is more than 40%, since it is difficult to form a desired amount of a retained austenite phase, which contributes to an increase in elongation, it is not possible to satisfy the relationship TS×El≥20000 MPa·%. Therefore, the area ratio of a tempered martensite phase with respect to the whole microstructure is set to be 40% or less, preferably 35% or less. Accordingly, the area ratio of a tempered martensite phase is set to be 20% or more and 40% or less, preferably 25% or more and 35% or less.

Area Ratio of a Retained Austenite Phase with Respect to the Whole Microstructure: 1% or More and 5% or Less A retained austenite phase is effective for increasing uniform elongation by preventing strain concentration as a result of undergoing strain induced transformation, in which a retained austenite phase undergoes transformation into a martensite phase in a portion to which strain is applied when a material is deformed to achieve an increase in hardness in the portion. In order to achieve desired excellent elongation (total elongation) by achieving high uniform elongation, it is necessary that the microstructure include 1% or more of a retained austenite phase. Therefore, the area ratio of a retained austenite phase with respect to the whole microstructure is set to be 1% or more, or preferably 2% or more. However, a retained austenite phase is hard due to its high C concentration. In the case where a retained austenite phase is included excessively in a steel sheet in an amount of more than 5%, hard portions are locally present. Therefore, in the case where a crack occurs in a hard galvannealed coating layer on the surface of a steel sheet when the material is deformed, since the crack easily propagates into the steel sheet, it is difficult to obtain a galvannealed steel sheet having excellent bendability. Therefore, the area ratio of retained austenite phase with respect to the whole microstructure is set to be 5% or less, or preferably 4% or less. Accordingly, the area ratio of a retained austenite phase is set to be 1% or more and 5% or less.

Area Ratio of a Martensite Phase with Respect to the Whole Microstructure: 2% or More and 20% or Less A martensite phase, which is hard due to its high dislocation density, is clearly discriminated from a tempered martensite phase, which is soft due to its low dislocation density. That is, in accordance with aspects of the present invention, the meaning of "martensite phase" does not include a tempered martensite phase. A hard martensite phase contributes largely to an increase in tensile strength, and, in order to achieve a TS of 900 MPa or more, it is necessary that the area ratio of a martensite phase be 2% or more, or preferably 5% or more. However, since there is an excessive increase in strength and there is a decrease in elongation and bendability in the case where the area ratio of a martensite phase is excessively large, it is necessary that the area ratio of a martensite phase be 20% or less, or preferably 15% or less. It is possible to achieve excellent elongation and bendability by controlling the area ratio of a martensite phase to be 2% or more and 20% or less, preferably 2% or more and 15% or less, or more preferably 5% or more and 15% or less.

Total Area Ratio of Cementite and a Pearlite Phase with Respect to the Whole Microstructure: 10% or Less Since cementite and a pearlite phase, in which cementite is present in layers, are hard and become the origins of cracks when a material is deformed, it is preferable that the amounts of cementite and a pearlite phase be as small as possible in order to achieve excellent elongation and bendability. Although there is a significant decrease in elongation and bendability, in particular, in the case where the total area ratio of cementite and a pearlite phase with respect to the whole microstructure is more than 10%, it is acceptable that the area ratio be about 10% or less. Therefore, in order to achieve excellent elongation and bendability, the total area ratio of cementite and a pearlite phase is set to be 10% or less, preferably 5% or less. Here, there is no problem even if cementite or a pearlite phase is not present in a microstructure.

In addition, the steel sheet according to aspects of the present invention is a high-strength galvannealed steel sheet (GA) and has a galvannealed coating layer on the surface of a high-strength steel sheet having the chemical composition and the microstructure described above. Although there is no particular limitation on the coating weight of the galvannealed coating layer, it is preferable that the coating layer having a coating weight of 30 $g/m^2$ to 90 $g/m^2$ per side be formed on one side or on both sides, and it is preferable that the Fe content in the coating layer be 8 to 14 mass %.

Hereafter, a method for manufacturing the high-strength galvannealed steel sheet according to aspects of the present invention will be described. The high-strength galvannealed steel sheet which is the object of aspects of the present invention is manufactured by hot-rolling a steel slab having the chemical composition described above, by pickling the hot-rolled steel sheet, thereafter by performing cold rolling, thereafter by performing a heat treatment including heating the cold-rolled steel sheet to a temperature of 800° C. or higher and 950° C. or lower, and then cooling the heated steel sheet, thereafter by performing another heat treatment including heating the treated steel sheet to a temperature of 700° C. or higher and 850° C. or lower, cooling the heated steel sheet to a temperature of 100° C. or higher and 300° C. or lower at a cooling rate of 5° C./sec or more and 50° C./sec or less, stopping the cooling, subsequently heating the cooled steel sheet to a temperature of 350° C. or higher and 600° C. or lower and holding the heated steel sheet for 10 seconds or more and 500 seconds or less, thereafter dipping the held steel sheet in a zinc bath in order to perform a galvanizing treatment, and performing a heat treatment in which the galvanized steel sheet is heated to a temperature of 480° C. or higher and 580° C. or lower in order to perform an alloying treatment. In the method according to aspects of the present invention, it is preferable that, after the pickling has been performed as described above, a heat treatment be performed in such a manner that the pickled steel sheet is heated to a temperature of 400° C. or higher and 750° C. or lower before the cold rolling is performed. In addition, temper rolling may be performed on the obtained galvannealed steel sheet.

The limited ranges of the manufacturing conditions and the reasons for the limitations will be described in detail hereafter.

There is no particular limitation on what method is used for manufacturing a steel slab in aspects of the present invention, and a steel slab may be manufactured using a thin-slab casting method or an ingot casting method. In particular, it is preferable that a continuous casting method be used in order to decrease the amount of segregation.

Also, there is no particular limitation on what method is used for hot rolling, and hot rolling may be performed using an ordinary method. Here, it is preferable that a heating temperature for hot rolling be 1100° C. or higher, and it is preferable that the upper limit of the heating temperature be about 1300° C. in order to decrease the amount of scale formed and to decrease a fuel consumption rate. In addition, it is preferable that the finishing temperature of hot rolling (finishing delivery temperature) be 850° C. or higher in order to prevent the formation of a layered microstructure composed of a ferrite phase and a pearlite phase. In addition, it is preferable that the upper limit of the finishing temperature of hot rolling be about 950° C. in order to decrease the amount of scale formed and to obtain a fine and uniform microstructure by inhibiting an increase in a crystal grain diameter. From the viewpoint of cold rolling performance and also of surface quality, it is preferable that a coiling temperature after hot rolling has been performed be 450° C. or higher, and that a coiling temperature be 600° C. or lower. Therefore, it is preferable that the coiling temperature be 450° C. or higher and 600° C. or lower.

The coiled steel sheet is subjected to pickling using an ordinary method, and then, cold-rolled into a desired thickness. There is no particular limitation on pickling conditions, and pickling may be performed using a conventionally known method such as one using hydrochloric acid. Also, there is no particular limitation on cold rolling conditions, and cold rolling may be performed using a conventionally known method. Here, although there is no particular limitation on the rolling reduction of cold rolling, it is preferable that the rolling reduction of cold rolling be 30% or more, and that the rolling reduction of cold rolling be 60% or less. Therefore, it is preferable that the rolling reduction of cold rolling be about 30% or more and 60% or less.

The cold-rolled steel sheet is subjected to a heat treatment in which the steel sheet is heated to a temperature of 800° C. or higher and 950° C. or lower and then cooled. And then, the heat-treated steel sheet is subjected to another heat treatment in which the steel sheet is heated to a temperature of 700° C. or higher and 850° C. or lower, cooled to a temperature of 100° C. or higher and 300° C. or lower at a cooling rate of 5° C./s or more and 50° C./s or less, after the cooling has been stopped, the steel sheet is subsequently heated to and held at a temperature of 350° C. or higher and 600° C. or lower for 10 seconds or more and 500 seconds or less, then dipped in a zinc bath in order to perform a galvanizing treatment, and then subjected to a heat treatment in which the galvanized steel sheet is heated to a temperature of 480° C. or higher and 580° C. or lower in order to perform an alloying treatment.

Heating Cold-Rolled Steel Sheet to a Temperature of 800° C. or Higher and 950° C. or Lower and then Cooling the Heated Steel Sheet The steel sheet which has been subjected to cold rolling (cold-rolled steel sheet) is subjected to a heat treatment (annealing). In the case where the heat treatment temperature is lower than 800° C., since the area ratio of an austenite phase is small during the heat treatment, the distribution of C and Mn into austenite progresses, which results in a austenite phase having high C concentration and high Mn concentration being finely dispersed. As a result, since a portion having high C concentration is fundamentally more readily to transform into a martensite phase than other portions, after the final heat treatment described below has been performed, there is an increase in the area ratio of a martensite phase, and non-uniform microstructure in which a martensite phase is present in layers is formed again due to the non-uniform distribution of chemical elements such as C and Mn. Therefore, since there is a decrease in elongation, the relationship TS×El≥20000 MPa·% is not satisfied. Accordingly, the temperature with which the heat treatment (annealing) is performed on the steel sheet after cold rolling has been performed is set to be 800° C. or higher, or preferably 840° C. or higher. On the other hand, in the case where the heat treatment temperature is higher than 950° C., that is, within a range for forming an austenite single phase, since there is an excessive increase in the grain diameter of austenite, there is also an excessive increase in the diameter of crystal grains which are finally obtained, which results in a decrease in the amount of grain boundaries which are the nucleation sites of a ferrite phase. As a result, when the final heat treatment is performed after that, since the formation of a ferrite phase is inhibited, there is an increase in the area ratios of a tempered martensite phase and a martensite phase, which results in a decrease in elongation. Therefore, the temperature with which the heat treatment (annealing) is performed on the steel sheet after cold rolling has been performed is set to be 950° C. or lower, or preferably 900° C. or lower. Accordingly, the heat treatment temperature (annealing temperature) is set to be 800° C. or higher and 950° C. or lower, or preferably 840° C. or higher and 900° C. or lower.

There is no particular limitation on what kind of cooling is performed after annealing has been performed, cooling may be appropriately performed to room temperature. Here, it is preferable that the cooling stop temperature of the cooling which is performed after annealing has been performed be 300° C. or higher, or more preferably 350° C. or higher, in order to achieve high TS-El balance by achieving satisfactory elongation as a result of promoting bainite transformation and forming a desirable retained austenite phase. In addition, it is preferable that the cooling stop temperature be 500° C. or lower, or more preferably 450° C. or lower. Therefore, it is preferable that the cooling stop temperature be 300° C. or higher and 500° C. or lower. In addition, it is preferable that the steel sheet be held at the cooling stop temperature range for 100 seconds or more, or more preferably 200 seconds or more, in order to form the desired amount of retained austenite phase by promoting an increase in C concentration in an austenite phase. In addition, it is preferable that the holding time at the cooling stop temperature range be 1000 seconds or less, or more preferably 500 seconds or less. Therefore, it is preferable that the holding time at the cooling stop temperature range be 100 seconds or more and 1000 seconds or less.

The final heat treatment is performed following the heat treatment (annealing) after cold rolling has been performed as described above. The final heat treatment is a heat treatment including heating the annealed steel sheet to a temperature of 700° C. or higher and 850° C. or lower, cooling the heated steel sheet to a temperature of 100° C. or higher and 300° C. or lower at a cooling rate of 5° C./sec or more and 50° C./sec or less, stopping the cooling, that is, cooling the heated steel sheet to a cooling stop temperature of 100° C. or higher and 300° C. or lower, subsequently heating the cooled steel sheet to a temperature of 350° C. or higher and 600° C. or lower and holding the steel sheet at the range for 10 seconds or more and 500 seconds or less, thereafter dipping the held steel sheet in a zinc bath in order to perform a galvanizing treatment, and performing a heat treatment in which the galvanized steel sheet is heated to a temperature of 480° C. or higher and 580° C. or lower in order to perform an alloying treatment.

Heat Treatment Temperature of the Final Heat Treatment: 700° C. or Higher and 850° C. or Lower In the case where the heat treatment temperature of the final heat treatment is lower than 700° C., since there is an excessive increase in the area ratio of a ferrite phase during the heat treatment, it is difficult to achieve a TS of 900 MPa or more. Therefore, the heat treatment temperature of the final heat treatment is set to be 700° C. or higher, or preferably 750° C. or higher. On the other hand, in the case where the heat treatment temperature of the final heat treatment is higher than 850° C., since there is an increase in the area ratio of an austenite phase during the heat treatment, there is a decrease in the area ratio of an ferrite phase in the steel sheet after a galvanizing treatment has been performed while there is an increase in the area ratios of phases other than a ferrite phase, and thus it is difficult to achieve satisfactory elongation. Therefore, the heat treatment temperature of the final heat treatment is set to be 850° C. or lower, or preferably 830° C. or lower. Accordingly, the heat treatment temperature of the final heat treatment is set to be 700° C. or higher and 850° C. or lower, or preferably 750° C. or higher and 830° C. or lower.

Cooling Rate: 5° C./Sec or More and 50° C./Sec or Less

The cooling rate for the cooling from the temperature of the final heat treatment is important for obtaining the desired area ratios of the desired phases. Here, in accordance with aspects of the present invention, "cooling rate" refers to an average cooling rate from the heat treatment temperature of the final heat treatment to the cooling stop temperature. In the case where the cooling rate is less than 5° C./s, since there is an excessive decrease in hardness due to an excessive increase in the amount of a ferrite phase formed, it is difficult to achieve a TS of 900 MPa or more. Therefore, the cooling rate is set to be 5° C./s or more, or preferably 10° C./s or more. On the other hand, in the case where the cooling rate is more than 50° C./s, since there is an excessive increase in hardness due to an increase in the area ratios of phases other than a ferrite phase, there is a decrease in elongation. Therefore, the cooling rate is set to be 50° C./s or less, preferably 40° C./s or less, or more preferably 30° C./s or less. Therefore, the cooling rate is set to be 5° C./s or more and 50° C./s or less, preferably 10° C./s or more and 40° C./s or less, or more preferably 10° C./s or more and 30° C./s or less. Here, although it is preferable that this cooling be performed using a gas cooling method, it is not necessary to put a particular limitation on what method is used for this cooling. Cooling means such as furnace cooling, mist cooling, roll cooling, or water cooling can also be employed including combination of aforementioned cooling means.

Cooling Stop Temperature: 100° C. or Higher and 300° C. or Lower

In the case where the cooling stop temperature is lower than 100° C., an excessive amount of martensite is formed when the cooling is stopped. Then, since the martensite phase is tempered when the heating (reheating) to a temperature of 350° C. or higher and 600° C. or lower is performed after the cooling, there is an excessive increase in hardness due to an increase in the area ratio of a tempered martensite phase which is finally obtained, and it is difficult to achieve excellent elongation. Therefore, the cooling stop temperature is set to be 100° C. or higher, or preferably 150° C. or higher. On the other hand, in the case where the cooling stop temperature is higher than 300° C., an insufficient amount of martensite phase is formed when the cooling is stopped. Since the martensite phase is tempered when the heating (reheating) to a temperature of 350° C. or higher and 600° C. or lower is performed after the cooling, there is an excessive decrease in the area ratio of a tempered martensite phase which is finally obtained. Moreover, since there is an increase in the amount of austenite after the steel sheet has been held at a temperature of 350° C. or higher and 600° C. or lower, a hard martensite phase is excessively formed when cooling is performed to room temperature after the holding has been performed, which makes excellent elongation difficult to be achieved due to an excessive increase in strength. Therefore, the cooling stop temperature is set to be 300° C. or lower, or preferably 250° C. or lower. Accordingly, in order to achieve a tensile strength TS of 900 MPa or more and excellent elongation by controlling the area ratios of a ferrite phase, a bainite phase, a martensite phase, and a retained austenite phase to be within the desired ranges, the cooling stop temperature is set to be 100° C. or higher and 300° C. or lower, preferably 100° C. or higher and 250° C. or lower, or more preferably 150° C. or higher and 250° C. or lower.

Heating to and Holding at a Temperature of 350° C. or Higher and 600° C. or Lower for 10 Seconds or More and 500 Seconds or Less After the cooling has been stopped as described above, heating (reheating) is performed to a temperature of 350° C. or higher and 600° C. or lower. In the case where the heating temperature (also referred to as reheating temperature) is lower than 350° C. or in the case where the holding time is less than 10 seconds, since it is not possible to form the specified amount of tempered martensite, an excessive amount of hard martensite phase is finally formed in the steel sheet, which makes excellent elongation difficult to be achieved due to an increase in the strength of the steel sheet. Therefore, the reheating temperature is set to be 350° C. or higher, or preferably 370° C. or higher, and the holding time is set to be 10 seconds or more, or preferably 20 seconds or more. On the other hand, in the case where the reheating temperature is higher than 600° C. or in the case where the holding time is more than 500 seconds, since an excessive amount of cementite is formed, or bainite transformation excessively progresses and thereby there is an increase in a bainite phase. Therefore, it is difficult to achieve satisfactory elongation due to a decrease in the area ratio of a retained austenite phase which is finally obtained, or it is difficult to achieve a tensile strength of 900 MPa or more due to the formation of a martensite phase being suppressed. Accordingly, the reheating temperature is set to be 600° C. or lower, or preferably 500° C. or lower, and the holding time is set to be 500 seconds or less, or preferably 180 seconds or less. Therefore, after the cooling has been stopped as described above, heating to a temperature of 350° C. or higher and 600° C. or lower and holding for 10 seconds or more and 500 seconds or less are performed.

Galvannealing Treatment

After holding the steel sheet at the reheating temperature as described above, the steel sheet is dipped in a zinc bath in order to perform a galvanizing treatment, and subjected to a galvannealing treatment in which the galvanized steel sheet is heated to a temperature of 480° C. or more and 580° C. or lower in order to perform an alloying treatment. Galvanizing may be performed using an ordinary method such as one in which a steel sheet is dipped in a zinc bath containing, by mass %, 0.05% to 0.25% of Al and having a temperature of 440° C. to 500° C. and in which coating weight is thereafter controlled using, for example, a gas wiping method. Subsequently, an alloying treatment is performed by heating the galvanized steel sheet to a temperature of 480° C. or higher and 580° C. or lower. In the case where the temperature of the alloying treatment (the alloying treatment temperature) is lower than 480° C., since alloying progresses at a low speed, Fe content in the coating layer is small, which results in a decrease in coatability in terms of, for example, adhesiveness. Therefore, the alloying treatment temperature is set to be 480° C. or higher, or preferably 500° C. or higher. On the other hand, in the case where the alloying treatment temperature is higher than 580° C., since an excessive amount of cementite is precipitated, and since there also is a decrease in the area ratio of a retained austenite phase which is finally obtained, it is not possible to achieve excellent elongation. Therefore, the alloying treatment temperature is set to be 580° C. or lower, or preferably 560° C. or lower. In order to achieve a strength TS of 900 MPa or more and excellent elongation, the alloying treatment temperature is set to be 480° C. or higher and 580° C. or lower, or preferably, 500° C. or higher and 560° C. or lower.

It is not necessary to put a particular limitation on what kind of cooling is performed after the alloying treatment has been performed, and cooling may be performed to room temperature using an ordinary method such as an air cooling method or a gas cooling method. In addition, although it is not necessary to put a particular limitation on what kind of apparatus is used for the final heat treatment, it is preferable that the final heat treatment including the galvannealing treatment described above be performed using a continuous galvanizing apparatus having a continuous annealing furnace from the viewpoint of productivity. Here, the steel sheet which has been subjected to a galvanizing treatment may be subjected to temper rolling for the purpose of, for example surface roughness adjustment and shape correction, or various kinds of painting treatments such as oiling and coating.

In addition, in accordance with aspects of the present invention, it is preferable that, after the pickling has been performed as described above, a heat treatment be performed in such a manner that the pickled steel sheet is heated to a temperature of 400° C. or higher and 750° C. or lower before the cold rolling is performed. The heat treatment which is performed after hot rolling and pickling have been performed and before cold rolling is performed is effective for controlling the area ratio of a martensite phase, which is formed excessively due to the non-uniform distribution of chemical elements such as C and Mn after the final heat treatment has been performed, to be within an appropriate range, by forming a microstructure which includes a ferrite phase as a parent phase and in which cementite is finely dispersed as a result of eliminating the non-uniform distribution of chemical elements such as C and Mn due to a hot-rolled microstructure. In addition, the heat treatment is effective for achieving increased TS-El balance and excellent bendability by eliminating a non-uniform microstructure in which a martensite phase is present in layers. In order to realize such effects, it is necessary that the heat treatment temperature of the heat treatment which is performed after hot rolling and pickling have been performed be 400° C. or higher, or preferably 450° C. or higher. However, in the case where the heat treatment temperature is higher than 750° C., that is, the heat treatment is performed in a temperature range in which a dual phase composed of a ferrite phase and an austenite phase is formed, a non-uniform microstructure in which chemical elements such as C and Mn are non-uniformly distributed is formed again after the heat treatment has been performed. In this case, since a martensite phase is more readily to be formed in a portion having high concentrations of C and Mn, it is difficult to obtain the desired microstructure due to a large martensite phase being formed after the final heat treatment has been performed, which makes the relationship TS×El≥20000 MPa·% difficult to be satisfied. Therefore, it is preferable that the heat treatment temperature be 750° C. or lower, more preferably 700° C. or lower, or further more preferably 650° C. or lower. Therefore, there is an optimum range for the heat treatment temperature in which the heat treatment is performed in order to form a markedly uniform microstructure before cold rolling is performed, and the heat treatment temperature with which the heat treatment is performed after hot rolling and pickling have been performed is set to be 400° C. or higher and 750° C. or lower, preferably 450° C. or higher and 700° C. or lower, or more preferably 450° C. or higher and 650° C. or lower.

Example 1

Molten steels having the chemical compositions given in Table 1 were manufactured and made into slabs, and then hot rolling was performed under the conditions that the heating temperature was 1200° C., that the finishing delivery temperature was 850° C., and that the coiling temperature was 500° C. Subsequently, pickling was performed using hydrochloric acid, then the hot-rolled steel sheets were subjected to a heat treatment (heat treatment before cold rolling) under the conditions given in Table 2, then cold rolling was performed with a rolling reduction of 40% to 50%, and then a heat treatment after cold rolling was performed in such a manner that heating and cooling were performed under the conditions given in Table 2. Subsequently, the final heat treatment was performed under the conditions given in Table 2. Here, a galvannealing treatment was performed in such a manner that the steel sheet was dipped in a zinc bath (having an Al concentration of 0.13 mass %) having a temperature of 460° C., that the galvanized steel sheet was subjected to an alloying treatment under the temperatures given in Table 2 in order to form a galvannealed coating layer having a coating weight of 30 to 60 g/m² per side on both sides, and that cooling was performed at a cooling rate of 10° C./s in order to obtain a high-strength galvannealed steel sheet having a thickness of 1.0 mm. Here, some of the high-strength galvannealed steel sheets were not subjected to the heat treatment before cold rolling. The material properties of the obtained high-strength galvannealed steel sheets were investigated by conducting the material property tests described below. The obtained results are given in Table 3.

TABLE 1

| Steel Type | Chemical Composition (mass %) | | | | | | | | Note |
| --- | --- | --- | --- | --- | --- | --- | --- | --- | --- |
| | C | Si | Mn | P | S | Al | N | Ca | |
| A | 0.170 | 1.60 | 2.30 | 0.007 | 0.0009 | 0.050 | 0.0050 | 0.0003 | Example |
| B | 0.210 | 1.50 | 2.10 | 0.004 | 0.0004 | 0.040 | 0.0040 | 0.0004 | Example |

TABLE 1-continued

| Steel | Chemical Composition (mass %) | | | | | | | | |
|---|---|---|---|---|---|---|---|---|---|
| Type | C | Si | Mn | P | S | Al | N | Ca | Note |
| C | 0.180 | 1.50 | 2.20 | 0.008 | 0.0008 | 0.050 | 0.0050 | 0.0002 | Example |
| D | 0.200 | 1.50 | 2.00 | 0.005 | 0.0004 | 0.045 | 0.0030 | 0.0004 | Example |
| E | 0.160 | 1.60 | 2.30 | 0.004 | 0.0006 | 0.035 | 0.0045 | 0.0003 | Example |
| F | 0.150 | 1.10 | 3.30 | 0.005 | 0.0005 | 0.040 | 0.0055 | 0.0002 | Comparative Example |

TABLE 2

| | | Heat Treatment before Cold Rolling | Heat Treatment after Cold Rolling | | Final Heat Treatment | | | | | | |
|---|---|---|---|---|---|---|---|---|---|---|---|
| No. | Steel Type | Heat Treatment Temperature (° C.) | Heat Treatment Temperature (° C.) | Cooling Stop Temperature (° C.) | Heat Treatment Temperature (° C.) | Cooling Rate (° C./s) | Cooling Stop Temperature (° C.) | Reheating Temperature (° C.) | Holding Time (sec) | Alloying Temperature (° C.) | Note |
| 1 | A | 480 | 840 | 380 | 800 | 15 | 180 | 420 | 60 | 550 | Example |
| 2 | B | 520 | 860 | 400 | 815 | 10 | 220 | 440 | 80 | 560 | Example |
| 3 | C | Undone | 880 | 360 | 805 | 20 | 240 | 460 | 40 | 550 | Example |
| 4 | D | 550 | 900 | 370 | 815 | 25 | 220 | 480 | 90 | 540 | Example |
| 5 | E | Undone | 880 | 400 | 800 | 30 | 160 | 400 | 180 | 560 | Example |
| 6 | F | 620 | 860 | 420 | 805 | 35 | 200 | 410 | 220 | 520 | Comparative Example |
| 7 | B | 600 | 760 | 400 | 815 | 7 | 180 | 440 | 70 | 530 | Comparative Example |
| 8 | B | 560 | 970 | 380 | 820 | 25 | 210 | 430 | 120 | 550 | Comparative Example |
| 9 | C | Undone | 880 | 420 | 660 | 20 | 240 | 400 | 50 | 570 | Comparative Example |
| 10 | C | Undone | 860 | 370 | 880 | 25 | 230 | 380 | 60 | 580 | Comparative Example |
| 11 | D | 480 | 890 | 400 | 790 | 2 | 210 | 410 | 100 | 560 | Comparative Example |
| 12 | D | 500 | 840 | 400 | 810 | 100 | 190 | 430 | 70 | 540 | Comparative Example |
| 13 | E | 640 | 870 | 380 | 820 | 20 | 80 | 450 | 60 | 520 | Comparative Example |
| 14 | E | 600 | 900 | 370 | 790 | 25 | 340 | 480 | 200 | 500 | Comparative Example |
| 15 | D | 550 | 830 | 420 | 810 | 15 | 220 | 300 | 300 | 530 | Comparative Example |
| 16 | D | 520 | 910 | 420 | 800 | 10 | 260 | 650 | 150 | 550 | Comparative Example |
| 17 | C | 460 | 840 | 380 | 810 | 15 | 170 | 420 | 5 | 560 | Comparative Example |
| 18 | C | 640 | 860 | 400 | 780 | 10 | 280 | 400 | 650 | 570 | Comparative Example |
| 19 | B | 530 | 880 | 380 | 760 | 15 | 150 | 380 | 70 | 420 | Comparative Example |
| 20 | B | 580 | 900 | 390 | 825 | 8 | 220 | 440 | 60 | 600 | Comparative Example |

Microstructure of Steel Sheet

The area ratios of the constituent phases with respect to the whole microstructure were determined by observing the cross section in the rolling direction which was located at ¼ of the thickness using an optical microscope. By using a microstructure photograph in the cross section obtained at a magnification of 1000 times, and by using image analysis, occupation areas were determined in a square region of 100 µm×100 µm which was arbitrarily selected. Here, the observation was conducted for 5 samples (five observation fields of view). In addition, when the microstructure observation was conducted, etching was performed using a liquid mixture of 3 vol. % picral and 3 vol. % sodium metabisulfite. The total area ratio of a ferrite phase and a bainite phase was determined under the assumption that regions appearing black in the observation of the microstructure corresponded to a ferrite phase (polygonal ferrite phase) or a bainite phase. In addition, the total area ratio of a tempered martensite phase, a martensite phase, a retained austenite phase, cementite, and a pearlite phase was determined under the assumption that regions other than the regions appearing black corresponded to a tempered martensite phase, a martensite phase, a retained austenite phase, cementite, or a pearlite phase, and the microstructure of the steel sheet was divided into two kinds of regions.

In addition, as described below, by determining the amount of retained austenite using an X-ray diffraction method, by converting the determined amount of retained austenite into the area ratio of a retained austenite phase, and by subtracting the area ratio of a retained austenite phase from the total area ratio of a tempered martensite phase, a martensite phase, a retained austenite phase, cementite, and a pearlite phase, the total area ratio of a tempered martensite phase, a martensite phase, cementite, and a pearlite phase was determined. Here, the amount of retained austenite was determined using an X-ray diffraction method using the Kα-ray of Mo. That is, by using a test piece having a measuring surface in a cross section which was located at about ¼ of the thickness of the steel sheet, and by calculating the amount (volume ratio) of an retained austenite phase from the peak intensities of the (211) and (220) planes of an austenite phase and the peak intensities of the (200) and (220) planes of a ferrite phase, the amount was converted into the area ratio of a retained austenite phase. The total area ratio of cementite and a pearlite phase was determined by using a microstructure photograph of a cross section obtained at a magnification of 1000 times using an optical microscope, by using image analysis, by determining an occupation area in a square region of 100 µm×100 µm which was arbitrarily selected, and by conducting the observation for 5 samples. Etching was performed using nital, and the area ratio of cementite and a pearlite phase was determined from the black region. Here, since it is not possible to observe small-size cementite in a bainite phase using an optical microscope, and since it is necessary to conduct microstructure observation at higher magnification using, for example, a scanning electron microscope (SEM) or a transmission electron microscope (TEM) in order to observe small-size cementite, the total area ratio of cementite and a pearlite phase described above does not contain cementite in a bainite phase. A tempered martensite phase was discriminated from a martensite phase by using a SEM microstructure photograph of a cross section obtained at a magnification of 1000 to 3000 times and by using image analysis, by determining occupation areas in a square region of 50 μm×50 μm which was arbitrarily selected, and by conducting the observation for 5 samples. Etching was performed using nital, and, under the assumption that a block-like region having a smooth surface which was observed in a SEM photograph corresponded to a martensite phase and that a block-like region having a surface on which, for example, carbides were observed corresponded to a tempered martensite phase, the area ratios were determined.

Tensile Properties (Tensile Strength and Elongation)

By using a JIS No. 5 test piece in accordance with JIS Z 2201 whose longitudinal direction (tensile direction) was at a right angle to the rolling direction, and by conducting a tensile test in accordance with JIS Z 2241, yield strength (YP), tensile strength (TS), and total elongation (El) were investigated. The results are given in Table 3. Here, elongation was evaluated in terms of TS-El balance, and a case where the relationship TS×El≥20000 MPa·% was satisfied was judged as satisfactory elongation.

Stretch Flange Formability

In accordance with The Japan Iron and Steel Federation Standard JFS T 1001, a hole-expansion ratio was determined. That is, by punching a hole having an initial diameter $d_0$ of 10 mm, by pushing up a conical punch having a point angle of 60° in order to expand the hole, by stopping pushing up the conical punch when a crack penetrated through the thickness direction, and by determining the diameter d of the punched hole after the crack penetrated through the thickness, a hole-expansion ratio was calculated by the equation hole-expansion ratio (%)=((d−$d_0$)/$d_0$)×100. By conducting the test 3 times for each number of steel sheet, the average value (λ) of the hole-expansion ratios was calculated. Here, stretch flange formability was evaluated in terms of TS-λ balance, and a case where the relationship TS×λ≥30000 MPa·% was satisfied was judged as satisfactory stretch flange formability.

Bendability

Using a steel sheet having a thickness of 1.0 mm, a sample was taken so that the ridge line of the bent sample is parallel to the rolling direction, and the size of the sample was 40 mm×100 mm (the longitudinal direction of the sample was a right angle to the rolling direction). By using a mold having a tip curvature radius of 2.5 mm, by performing V bending at an angle of 90° with a pressing load of 29.4 kN at the bottom dead point, and by conducting a visual test on whether or not a crack occurred at the bending apex, a case where a crack did not occur was judged as a case of satisfactory bendability.

TABLE 3

| | | Microstructure* | | | | | Material Property | | | | | | | |
|---|---|---|---|---|---|---|---|---|---|---|---|---|---|---|
| | | | | | | | | | | | Bendability | | | |
| No. | Steel Type | α + B (%) | TM (%) | γ (%) | M (%) | C + P (%) | YP (MPa) | TS (MPa) | El (%) | λ (%) | (Crack Occurrence) | TS × El (MPa · %) | TS × λ (MPa · %) | Note |
| 1 | A | 47 | 36 | 3 | 8 | 6 | 620 | 1000 | 22.0 | 33 | not Occurred | 22000 | 33000 | Example |
| 2 | B | 51 | 33 | 2 | 6 | 8 | 610 | 990 | 22.5 | 32 | not Occurred | 22275 | 31680 | Example |
| 3 | C | 49 | 31 | 2 | 10 | 8 | 640 | 1020 | 20.6 | 31 | not Occurred | 21012 | 31620 | Example |
| 4 | D | 46 | 32 | 3 | 12 | 7 | 620 | 1050 | 21.3 | 30 | not Occurred | 22365 | 31500 | Example |
| 5 | E | 44 | 35 | 4 | 11 | 6 | 610 | 1030 | 21.0 | 31 | not Occurred | 21630 | 31930 | Example |
| 6 | F | <u>25</u> | 38 | 5 | <u>25</u> | 7 | 890 | 1110 | 16.4 | 18 | Occurred | 18204 | 19980 | Comparative Example |
| 7 | B | <u>25</u> | 31 | 2 | <u>36</u> | 6 | 820 | 1170 | 12.0 | 15 | Occurred | 14040 | 17550 | Comparative Example |
| 8 | B | 22 | 42 | 4 | 26 | 6 | 940 | 1080 | 14.2 | 21 | Occurred | 15336 | 22680 | Comparative Example |
| 9 | C | <u>73</u> | <u>14</u> | 2 | 7 | 4 | 510 | 770 | 28.0 | 48 | not Occurred | 21560 | 36960 | Comparative Example |
| 10 | C | <u>25</u> | 38 | 4 | <u>26</u> | 7 | 700 | 1150 | 14.8 | 20 | Occurred | 17020 | 23000 | Comparative Example |
| 11 | D | 72 | 16 | 2 | 5 | 5 | 550 | 790 | 27.5 | 45 | not Occurred | 21725 | 35550 | Comparative Example |
| 12 | D | <u>24</u> | 33 | 2 | <u>33</u> | 8 | 860 | 1160 | 15.6 | 23 | Occurred | 18096 | 26680 | Comparative Example |
| 13 | E | <u>21</u> | <u>52</u> | 1 | 19 | 7 | 1020 | 1180 | 13.5 | 28 | Occurred | 15930 | 33040 | Comparative Example |
| 14 | E | 43 | 15 | 2 | 33 | 7 | 940 | 1150 | 17.2 | 18 | Occurred | 19780 | 20700 | Comparative Example |
| 15 | D | 45 | <u>13</u> | 1 | <u>36</u> | 5 | 1020 | 1230 | 12.5 | 15 | Occurred | 15375 | 18450 | Comparative Example |
| 16 | D | 35 | 29 | 1 | 18 | <u>17</u> | 570 | 1100 | 14.8 | 22 | Occurred | 16280 | 24200 | Comparative Example |
| 17 | C | 49 | 18 | 1 | 32 | 0 | 680 | 1110 | 17.1 | 25 | Occurred | 18981 | 27750 | Comparative Example |
| 18 | C | 52 | 35 | 4 | <u>1</u> | 8 | 650 | 860 | 25.4 | 38 | not Occurred | 21844 | 32680 | Comparative Example |
| 19 | B | 49 | 33 | <u>8</u> | <u>10</u> | 0 | 605 | 985 | 26.4 | 31 | Occurred | 26004 | 30535 | Comparative Example** |
| 20 | B | 46 | 26 | 0 | 13 | 15 | 610 | 1050 | 16.0 | 17 | Occurred | 16800 | 17850 | Comparative Example |

* α ferrite phase,
B: bainite phase,
TM: tempered martensite phase,
γ: retained austenite phase,
M: martensite phase,
C: cementite,
P: pearlite phase
** not alloyed As Table 3 indicates, in the case of the examples of the present invention, high-strength galvannealed steel sheets having a tensile strength of 900 MPa or more which are excellent in terms of elongation so that the relationship TS×El≥20000 MPa·% is satisfied, which are excellent in terms of stretch flange formability so that the relationship TS×λ≥30000 MPa·% is satisfied, and which are excellent in terms of bendability are obtained. On the other hand, in the case of No. 6 whose chemical composition of steel is out of the range according to aspects of the present invention, since the total area ratio of a ferrite phase and a bainite phase with respect to the whole microstructure is small, and since the area ratio of a martensite phase is large, the elongation is small. In the case of No. 7 where the heat treatment temperature after cold rolling has been performed is lower than the range according to aspects of the present invention, and in the case of No. 8 where the heat treatment temperature after cold rolling has been performed is higher than the range according to aspects of the present invention, since the area ratio of a martensite phase is large, the elongation is small. In the case of No. 9 where the heat treatment temperature for the final heat treatment is low, and in the case of No. 11 where the cooling rate for the final heat treatment is low, since the total area ratio of a ferrite phase and a bainite phase with respect to the whole microstructure is excessively large, the TS is less than 900 MPa. In the case of No. 10 where the heat treatment temperature for the final heat treatment is high, in the case of No. 12 where the cooling rate for the final heat treatment is high, in the case of No. 14 where the cooling stop temperature for the final heat treatment is high, in the case of No. 15 where the reheating temperature is low, and in the case of No. 17 where the holding time at a reheating temperature is short, since the area ratio of a martensite phase with respect to the whole microstructure is large, the elongation is small. In the case of No. 13 where the cooling stop temperature for the final heat treatment is low, since the area ratio of a tempered martensite phase with respect to the whole microstructure is large, the elongation is small. In the case of No. 16 where the reheating temperature is high, and in the case of No. 20 where the alloying treatment temperature is high, since the total area ratio of cementite and a pearlite phase is large, the elongation is small. In the case of No. 18 where the holding time at the reheating is long, since the area ratio of a martensite phase is small, the TS is less than 900 MPa. In the case of No. 19 where the alloying treatment temperature is low, although satisfactory elongation is achieved, bendability is poor, and, since the galvanized coating layer formed on the surface of the steel sheet is not alloyed after the steel sheet has been dipped in the zinc bath, galvannealed coating layer is not obtained.

INDUSTRIAL APPLICABILITY

According to aspects of the present invention, it is possible to obtain a high-strength galvannealed steel sheet having a tensile strength (TS) of 900 MPa or more which is inexpensive and which is excellent in terms of elongation, bendability, and stretch flange formability, even if C content in steel sheet is small, and even if expensive chemical elements such as Ti, Nb, V, Cu, Ni, Cr, and Mo are not actively added. In addition, the high-strength galvannealed steel sheet according to aspects of the present invention can suitably be used not only for automobile parts but also for, for example, the applications for building and domestic electrical appliances in which dimension accuracy and formability are strictly required.

The invention claimed is:

1. A high-strength galvannealed steel sheet having a chemical composition containing, by mass %,
C: 0.14% or more and 0.24% or less,
Si: 0.8% or more and 1.8% or less,
Mn: 1.0% or more and 3.0% or less,
P: 0.020% or less,
S: 0.0040% or less,
Al: 0.01% or more and 0.1% or less,
N: 0.01% or less,
Ca: 0.0001% or more and 0.0020% or less, and
the balance comprising Fe and incidental impurities, and
a microstructure, in which the total area ratio of a ferrite phase and a bainite phase with respect to the whole microstructure is 30% or more and 70% or less, in which the area ratio of a tempered martensite phase with respect to the whole microstructure is 20% or more and 40% or less, in which the area ratio of a retained austenite phase with respect to the whole microstructure is 1% or more and 5% or less, in which the area ratio of a martensite phase with respect to the whole microstructure is 11% or more and 20% or less, and in which the total area ratio of cementite and a pearlite phase with respect to the whole microstructure is 6% or more and 10% or less,
wherein the steel sheet has an average value (λ) of hole-expansion ratios of 33% or less.

2. A method for manufacturing a high-strength galvannealed steel sheet, the method comprising hot-rolling a steel slab having the chemical composition according to claim 1, pickling the hot-rolled steel sheet, thereafter performing cold rolling, thereafter performing a heat treatment including heating the cold-rolled steel sheet to a temperature of 800° C. or higher and 950° C. or lower, and then cooling the heated steel sheet, and thereafter performing another heat treatment including heating the treated steel sheet to a temperature of 700° C. or higher and 850° C. or lower, cooling the heated steel sheet to a temperature of 100° C. or higher and 300° C. or lower at a cooling rate of 5° C./sec or more and 50° C./sec or less, stopping the cooling, subsequently heating the cooled steel sheet to a temperature of 350° C. or higher and 600° C. or lower and holding the heated steel sheet for 10 seconds or more and 500 seconds or less, thereafter dipping the held steel sheet in a zinc bath in order to perform a galvanizing treatment, and heating the galvanized steel sheet to a temperature of 480° C. or higher and 580° C. or lower in order to perform an alloying treatment.

3. The method for manufacturing a high-strength galvannealed steel sheet according to claim 2, the method further comprising performing a heat treatment on the pickled steel sheet in such a manner that the pickled steel sheet is heated to a temperature of 400° C. or higher and 750° C. or lower before the cold rolling is performed.

* * * * *